(12) United States Patent
Goettsch et al.

(10) Patent No.: US 8,142,316 B2
(45) Date of Patent: Mar. 27, 2012

(54) POWER TRANSMISSION BELTS

(75) Inventors: Larry Dean Goettsch, Lincoln, NE (US); Jeffrey Dwight Lofgren, Lincoln, NE (US)

(73) Assignee: Veyance Technologies, Inc., Fairlawn, OH (US)

( * ) Notice: Subject to any disclaimer, the term of this patent is extended or adjusted under 35 U.S.C. 154(b) by 440 days.

(21) Appl. No.: 11/633,774

(22) Filed: Dec. 5, 2006

(65) Prior Publication Data
US 2008/0132370 A1    Jun. 5, 2008

(51) Int. Cl.
*F16G 1/28* (2006.01)
(52) U.S. Cl. .................. 474/260; 474/271; 474/205
(58) Field of Classification Search .......... 474/268, 474/202, 204, 205, 266, 267, 269, 260, 271; 525/178, 191
See application file for complete search history.

(56) References Cited

U.S. PATENT DOCUMENTS

| | | | | |
|---|---|---|---|---|
| 3,607,502 A * | 9/1971 | Marzocchi et al. | 156/142 |
| 3,660,974 A * | 5/1972 | Marzocchi et al. | 57/258 |
| 3,872,937 A * | 3/1975 | van Gils | 442/168 |
| 3,888,805 A * | 6/1975 | Van Gils et al. | 428/296.4 |
| 3,919,025 A * | 11/1975 | Ray | 156/141 |
| 3,965,055 A * | 6/1976 | Shichman et al. | 525/176 |
| 3,981,206 A * | 9/1976 | Miranti et al. | 474/238 |
| 4,024,773 A * | 5/1977 | Hartman et al. | 474/263 |
| 4,056,591 A * | 11/1977 | Goettler et al. | 264/108 |
| 4,123,946 A * | 11/1978 | Hollaway, Jr. | 474/263 |
| 4,192,790 A | 3/1980 | Barnhart et al. | 260/31.2 |
| 4,216,679 A * | 8/1980 | Howerton et al. | 474/238 |
| 4,461,859 A * | 7/1984 | Girgis | 524/62 |
| 4,501,771 A * | 2/1985 | Long | 427/176 |
| 5,178,586 A * | 1/1993 | Mizuno et al. | 474/266 |
| 5,281,651 A * | 1/1994 | Arjunan et al. | 524/519 |
| 5,380,571 A | 1/1995 | Ozawa et al. | 428/36.9 |
| 5,478,286 A * | 12/1995 | Hamano et al. | 474/205 |
| 5,484,497 A * | 1/1996 | Fujiwara et al. | 156/110.1 |
| 5,501,908 A * | 3/1996 | Shioyama et al. | 428/395 |
| 5,531,650 A * | 7/1996 | Azuma | 474/260 |
| 5,651,995 A * | 7/1997 | Oyama et al. | 524/565 |
| 5,910,544 A * | 6/1999 | Ozawa et al. | 525/178 |
| 6,056,656 A * | 5/2000 | Kitano et al. | 474/268 |
| 6,062,283 A | 5/2000 | Watanabe et al. | 152/510 |
| 6,217,961 B1 * | 4/2001 | Hert et al. | 428/36.8 |
| 6,220,983 B1 * | 4/2001 | Osako et al. | 474/260 |
| 6,352,488 B1 * | 3/2002 | Morris et al. | 474/263 |
| 6,359,071 B1 | 3/2002 | Watanabe et al. | 525/184 |
| 6,409,621 B1 | 6/2002 | Billups et al. | 474/263 |
| 6,491,598 B1 * | 12/2002 | Rosenboom | 474/260 |
| 6,737,461 B2 * | 5/2004 | Hannay et al. | 524/397 |

(Continued)

FOREIGN PATENT DOCUMENTS

EP    0 766 022 A    4/1997

(Continued)

*Primary Examiner* — Robert A Siconolfi
*Assistant Examiner* — Stephen Bowes
(74) *Attorney, Agent, or Firm* — Alvin T. Rockhill; Kathleen K. Bowen

(57) ABSTRACT

A belt has a compression section, a tension section, and a load carrying section disposed between the compression section and the tension section. The belt has an elastomeric/thermoplastic material, the elastomeric/thermoplastic material has 50 to 90 parts per hundred of an elastomer and 10 to 50 parts per hundred thermoplastic.

20 Claims, 2 Drawing Sheets

U.S. PATENT DOCUMENTS

| | | | |
|---|---|---|---|
| 6,824,871 B2 * | 11/2004 | Chu | 428/395 |
| 6,860,962 B2 * | 3/2005 | Pelton | 156/307.5 |
| 7,083,037 B2 * | 8/2006 | Durrer et al. | 198/335 |
| 2002/0098935 A1 * | 7/2002 | Danhauer et al. | 474/261 |
| 2003/0050143 A1 * | 3/2003 | Gregg et al. | 474/263 |
| 2003/0055179 A1 * | 3/2003 | Ota et al. | 525/242 |
| 2004/0214676 A1 | 10/2004 | Shiriike et al. | 474/260 |
| 2005/0147817 A1 * | 7/2005 | Pelton | 428/378 |
| 2006/0293140 A1 * | 12/2006 | Daugherty et al. | 474/261 |

FOREIGN PATENT DOCUMENTS

| | | |
|---|---|---|
| WO | WO 00/04098 A | 1/2000 |

* cited by examiner

POWER TRANSMISSION BELTS

FIELD OF THE INVENTION

The present invention is directed to power transmission belts. More specifically, the invention is directed to power transmission belts having improved characteristics achieved by the use of a blended rubber and thermoplastics composition.

BACKGROUND OF THE INVENTION

In conventional power transmission belts, the belt has an inner compression section, an outer tension section, and an intermediate neutral plane. Typically, helically wound reinforcing cords are located within the neutral plane and so the neutral plane is also referred to as the load carrying zone. Such belts also having a variety of groove and rib configurations, using longitudinal or transverse grooves or a combination of both. The grooves are located in the inner compression section of the belt. The grooves assist in engaging a pulley in the power transmission system. For some belts, grooves and rib configurations may also be provided in the outer tension section.

Developments in the automotive industry have resulted in higher engine output in a more compact engine compartment. As a result, power transmission belts on these engines have been required to operate under high load, at high tensions and at high temperatures while reducing belt width. This environment demands a high quality belt capable of withstanding these severe conditions. One method to improve the properties of such belts has been to improve the materials from which the belts are made.

SUMMARY OF THE INVENTION

The present invention is directed to a power transmission belt. The belt contains therein a compound providing the belt with improved properties in regards to belt growth, wicking, abrasion, and durability.

Disclosed is a belt having a compression section, a tension section, and a load carrying section disposed between the compression section and the tension section. The belt has an elastomeric/thermoplastic material, the elastomeric/thermoplastic material has 50 to 90 parts per hundred of an elastomer and 10 to 50 parts per hundred thermoplastic. Alternatively, the elastomeric/thermoplastic material is formed from 60 to 80 parts per hundred elastomer and 20 to 40 parts per hundred thermoplastic.

In one aspect of the invention, the elastomer of the elastomeric/thermoplastic material is selected from the group consisting of natural rubber, polychloroprene, acrylonitrile-butadiene copolymers, polyisoprene, zinc salts of unsaturated carboxylic acid ester grafted hydrogenated nitrile butadiene elastomers, styrene-butadiene rubbers, polybutadiene, ethylene propylene diene monomer rubber, hydrogenated acrylonitrile-butadiene copolymers, polyurethane, and ethylene-acrylic elastomers.

In another aspect of the invention, the elastomer of the elastomeric/thermoplastic material is a butadiene copolymer.

In another aspect of the invention, the thermoplastic of the elastomeric/thermoplastic material is selected from the group consisting of polyolefin thermoplastic resins, polyamide thermoplastic resins, and vinyl resins. Alternatively, the thermoplastic of the elastomeric/thermoplastic material is a vinyl resin.

In another aspect of the invention, the elastomeric/thermoplastic material forms an insulation layer in the belt, the insulation layer being located in the compression section of the belt.

In another aspect of the invention, the belt has at least one drive surface. The drive surface has a fabric layer bonded to the outer surface of the belt and the elastomeric/thermoplastic material impregnates the fabric layer.

In another aspect of the invention, the load carrying section of the belt has reinforcing cords therein. The cords are embedded in a material, the embedding material being the elastomeric/thermoplastic material.

BRIEF DESCRIPTION OF THE DRAWINGS

The invention will be described by way of example and with reference to the accompanying drawings in which.

DETAILED DESCRIPTION OF THE INVENTION

Figure 1:
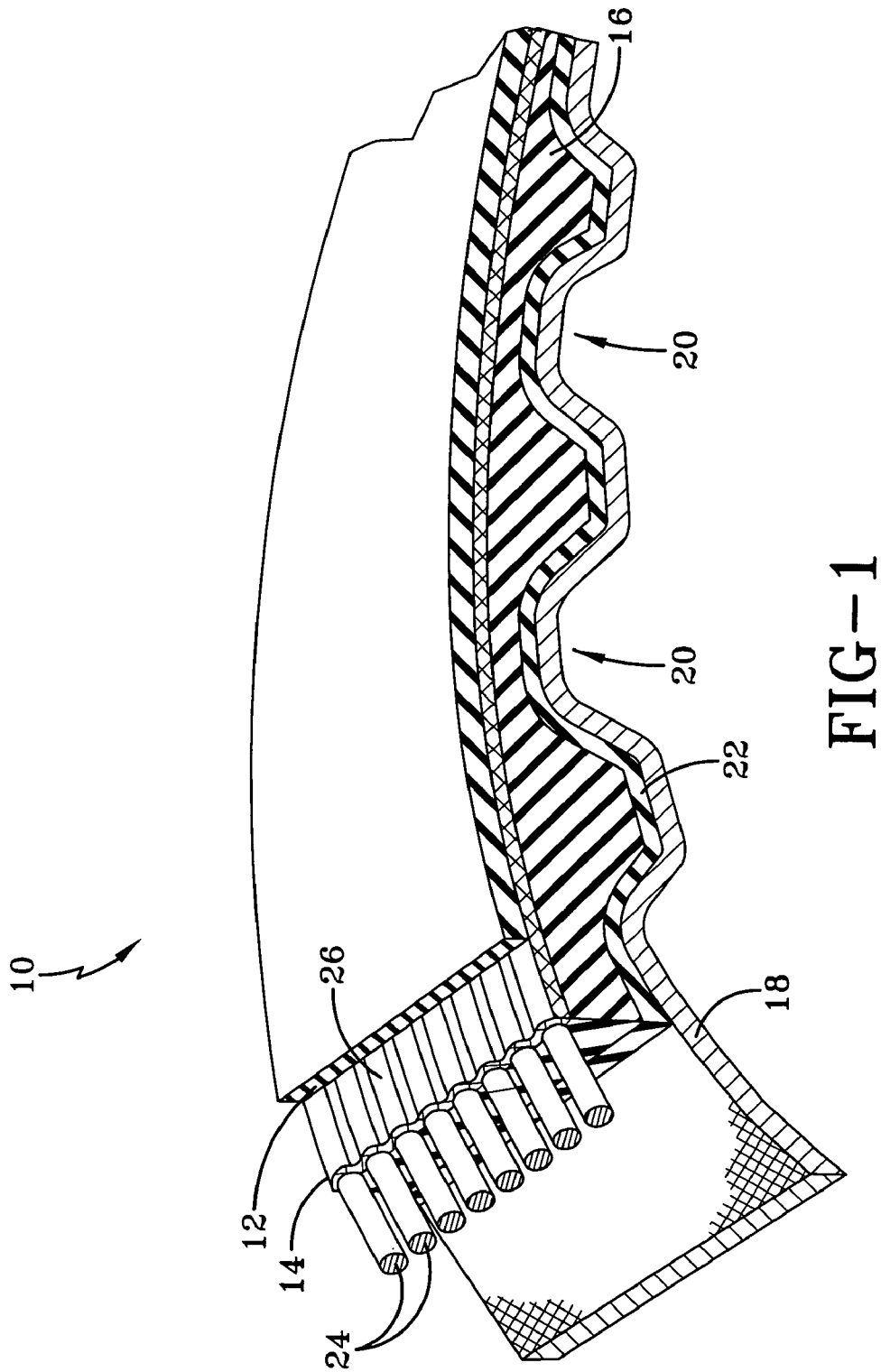
FIG. 1 is a perspective view of a synchronous drive belt.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification.

FIG. 1 illustrates an endless power transmission belt 10. The belt 10 is particularly adapted to be used in associated sheaves in accordance with techniques known in the art. The belt is particularly suited for use in synchronous drive applications. The belt 10 is adapted to be used in so-called torque sensing drives, application where shock loads of varying belt tension are imposed on the belt, applications where the belt is operated at variable speeds, applications where the belt is spring-loaded to control its tension and the like.

The belt 10 comprises a tension section or backing 12, a cushion, or compression, section 16, a load-carrying section 14 disposed between the tension section 12 and cushion section 16, and a fabric layer 18 adhered to drive surface 20. The belt may have an insulation layer 22 located between the cushion section 16 and the fabric layer 18 to prevent or decrease rubber from the cushion section 16 from permeating through the fabric 18 to the drive surface 20.

In the belts of the present invention, there is at least one drive surface 20 having a fabric layer 18 bonded to the outer surface. In the embodiment shown in FIG. 1, there is one drive surface 20 having a fabric layer 18. In accordance with other embodiments, the belt 10 may have multiple drive surfaces of two or more. A fabric layer may also be on the non-drive outer surface of the belt. The fabric layer 18 may be made from a woven, non-woven or knitted fabric. The fabrics for use in the present invention are made of conventional materials including nylon (such as nylon 4, 6, nylon 6, 6 and nylon 6), cotton, polyester, cotton/polyester, nylon/polyester, cotton/nylon, Lycra™ (segmented polyurethane), aramid, rayon and the like. Preferably, the fabric is made of nylon 6, 6.

The load-carrying section 14 has load-carrying means in the form of load-carrying filament or cords 24 embedded in a compound 26. The cords may be transverse or parallel to the length of the belt. The cords 24 or filaments may be made of any suitable material; examples of such materials include aramid, fiberglass, nylon, polyester, cotton, steel, carbon fiber and polybenzoxazole.

The drive surface 20 of the belt 10 of FIG. 1 is synchronous. In accordance with other embodiments, the belts of the present invention also include those belts where the drive surface of the belt may be smooth, single V-grooved, and multi-V-grooved. Representative examples of synchronous include belts having trapezoidal or curvilinear teeth.

The elastomers for use in the tension section 12 and the compression section 16 may be the same or different. Conventional elastomers which may be used in one or both of these sections include natural rubber, polychloroprene, acrylonitrile-butadiene copolymers (NBR), polyisoprene, zinc salts of unsaturated carboxylic acid ester grafted hydrogenated nitrile butadiene elastomers, styrene-butadiene rubbers, polybutadiene, ethylene propylene diene monomer rubber (EPDM), hydrogenated acrylonitrile-butadiene copolymers (HNBR), polyurethane, and ethylene-acrylic elastomers.

In the belt 10, the insulation layer 22 is a blend of an elastomer and a thermoplastic. The compound 26 has 50-90 parts per hundred (pph) elastomer and 10-50 pph thermoplastic, with preferred amounts of 60-80 pph elastomer and 20-40 pph thermoplastic. Herein, the term elastomer identifies thermosetting high polymers that solidify or set irreversibly when heated, usually due to a cross-linking reaction induced by heat or radiation of the material. Most elastomers have the ability to stretch and retract rapidly to approximately their original length when released. Herein, the term thermoplastic identifies a class of high polymers that soften when exposed to heat and returns to its original condition when cooled to room temperature.

The elastomer component of the insulation layer 22 is selected from conventional elastomers used in manufacturing belts and includes, but is not limited to, the list of elastomers set forth above in the discussion of elastomers for use in the tension section 12 and compression section 16 of the belt 10. Preferred elastomers are butadiene copolymers such as polybutadiene, NBR, and HNBR.

The thermoplastic component may be: polyolefin thermoplastic resins, such as high density polyethylene (HDPE), ultrahigh molecular weight polyethylene (UHMWPE), polypropylene (PP), and ethylene propylene copolymer thermoplastic resin; polyamide thermoplastic resins, such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MxD6), nylon 6T, nylon 6/6T copolymer, nylon 66/PP copolymer, and nylon 66/PPS copolymer; or vinyl resins, such as vinyl acetate (EVA), polyvinylalcohol (PVA), vinyl alcohol/ethylene copolymer (EVOH), polyvinylidene chloride (PVDC), polyvinyl chloride (PVC), vinyl chloride/vinylidene chloride copolymer, and vinylidene chloride/methylacrylate copolymer. Preferred thermoplastics are the vinyl resin thermoplastics.

In addition to the elastomer and thermoplastic components, the compound also contains curing agents. Curing agents which may be employed in the compositions of the invention include, for example, di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy(2-ethyl hexanoate), 2,5-dimethyl-2,5-di(benzoylperoxy)-hexane, benzoyl peroxide, 2,5-dimethyl-2,5-(t-butyl peroxy)-hexane, 1,1-ditert-butyl peroxy-3,3,5-trimethyl cyclohexane, 4,4-ditert-butyl peroxy n-butyl valerate and n-butyl-4,4-bis(t-butyl peroxy) valerate. Additional curing agents which may be employed include diacyl or dialkyl peroxides such as α,α'-bis(t-butylperoxy)-isopropylbenzene, 2,5-dimethyl-2,5-di(t-butylperoxy) hexane, di-t-butyl peroxide, 2,5-dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy(2-ethyl hexanoate), 2,5-dimethyl-2,5-di (benzoylperoxy)-hexane and benzoyl peroxide. All of the above curing agents are commercially available. The amount of curing agent may vary, and will generally range from 0.1 to 10 phr.

The compound also contains a reinforcement material such as carbon black. The amount of carbon black will vary from 15 to 75 phr rubber. A portion of the carbon black may be specifically treated to be electro-conductive to reduce static build up in the belt 10.

An exemplary formulation for the compound is as follows:

TABLE

| Ingredient | Parts per Hundred Rubber |
|---|---|
| HNBR | 70 |
| Polyvinyl chloride | 30 |
| Carbon black | 65 |
| Silica | 15 |
| Peroxide | 5 |
| Curing co-agent | 3.5 |
| Resorcinol | 10 |

A belt having a construction of the type illustrated in FIG. 1 was assembled. The reinforcing cords 24 were of a typical aramid construction. The elastomeric/thermoplastic compound having the formulation as identified in the above Table was used to form the insulation layer 22. This belt was tested against a control belt of similar construction, the control belt having no elastomeric/thermoplastic compound therein. The belts were placed in a humidity chamber (100% rh, RT) for 14 days. After fifteen days, the control belt experienced a decrease in length of about 0.40 mm, while the test belts had a length decrease of not more than 0.15 mm—less than half of the length decrease of the control belt.

While elastomers are generally air impervious, some elastomers have greater impermeability characteristics than others. Typically, in belt construction, as there is no isolate air chamber to maintain, elastomers with greater impermeability characteristics are not typical chosen to construct power transmission belts. As air travels into the belt, it may carry moisture into the belt, and be absorbed by the cords 24. If the cords are formed of a material that absorbs moisture, the cords will expand, causing the belt to shrink. Such shrinkage can occur in either the circumferential or lateral direction of the belt. The blending of the thermoplastic into the elastomer reduces air and moisture migration into the belt—reducing moisture absorption by the cords and improving belt life. Because moisture may be absorbed through any layer of the belt, the elastomeric/thermoplastic compound disclosed may also be used in other areas, such as the embedding material 26 to prevent moisture migration in to the load carrying cords 24. When the compound is used in the insulation layer, the elastomeric/thermoplastic compound also assists in abrasion resistance of the belt as the compound can penetrate the fabric. The elastomeric/thermoplastic compound also improves the adhesion between the various layers and elements of the belt.

Figure 2:
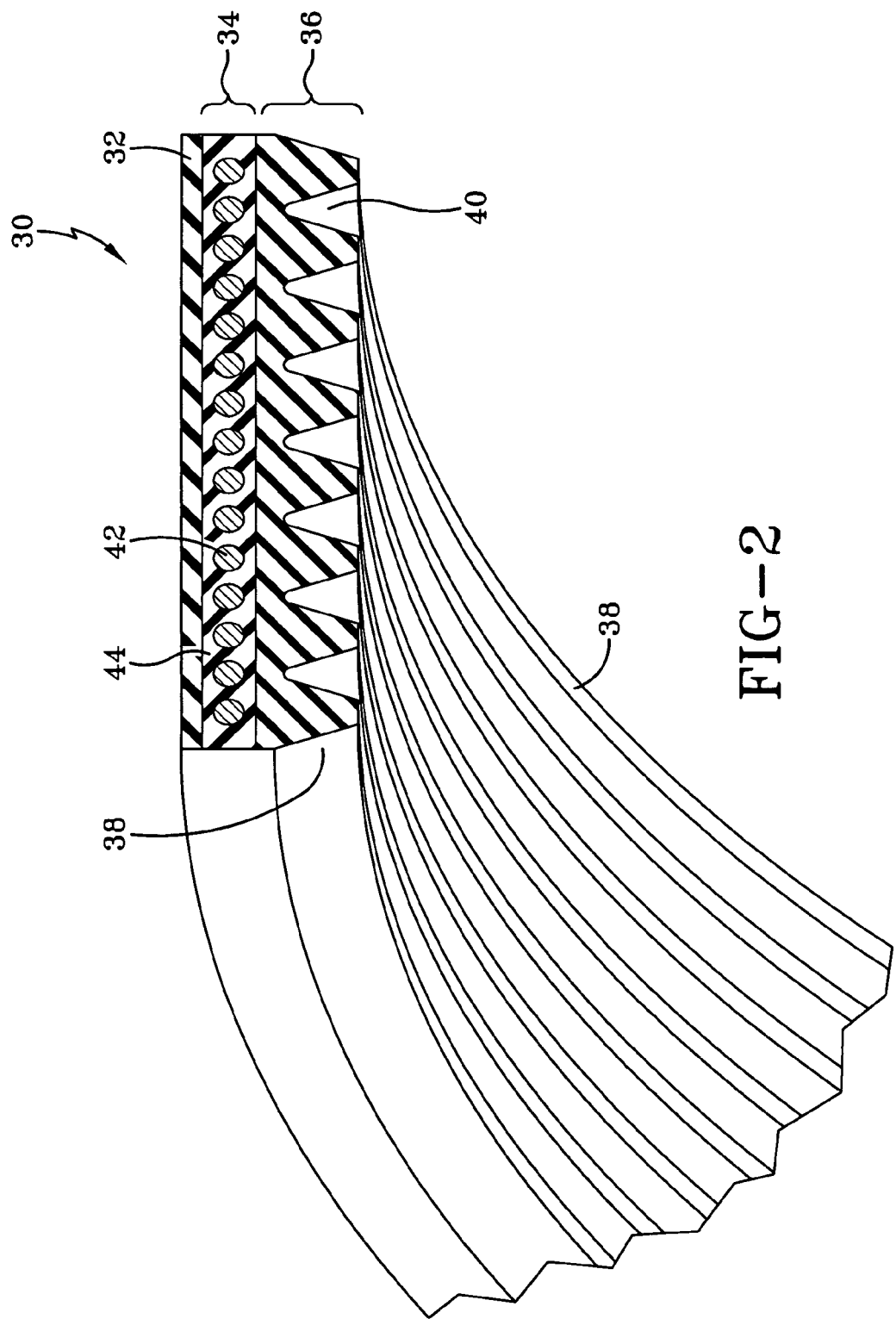
FIG. 2 is a perspective view of a timing v-belt.

FIG. 2 illustrates a poly-v belt 30. The belt 30 has a tension section 32, a load carrying section 34, and compression section 36. The compression section 36 has a plurality of longitudinal ribs 38 with a plurality of longitudinal grooves 40. The load carrying section 34 has longitudinal reinforcing cords 42 embedded in a suitable material 44.

The elastomeric/thermoplastic material may be used as the material 44 in which the reinforcing cords 42 are embedded. Alternatively, the compression section may be provided with an additional layer formed of the elastomeric/thermoplastic material.

What is claimed is:

1. A synchronous drive belt having a drive surface that includes trapezoidal or curvilinear teeth, a compression section, a tension section, a load carrying section disposed between the compression section and the tension section, a fabric layer which is adhered to the outer drive surface of the belt, and an insulation layer located between the compression section and the fabric layer, wherein the load carrying section includes load carrying filaments or cords which are embedded in an elastomeric/thermoplastic material, the insulation layer comprising the elastomeric/thermoplastic material, the elastomeric/thermoplastic material comprising 50 to 90 parts per hundred of an elastomer and 10 to 50 parts per hundred thermoplastic, the tension section comprising a member selected from the group consisting of natural rubber, polychloroprene, acrylonitrile-butadiene copolymer, polyisoprene, zinc salts of unsaturated carboxylic acid ester grafted hydrogenated nitrile butadiene elastomers, styrene-butadiene rubber, polybutadiene rubber, ethylene propylene diene monomer rubber, hydrogenated acrylonitrile-butadiene copolymer, polyurethane, and ethylene-acrylic elastomers, and the compression section comprising a member selected from the group consisting of natural rubber, polychloroprene, acrylonitrile-butadiene copolymer, polyisoprene, zinc salts of unsaturated carboxylic acid ester grafted hydrogenated nitrile butadiene elastomers, styrene-butadiene rubber, polybutadiene rubber, ethylene propylene diene monomer rubber, hydrogenated acrylonitrile-butadiene copolymer, polyurethane, and ethylene-acrylic elastomers.

2. The belt of claim 1 wherein the elastomeric/thermoplastic material comprises 60 to 80 parts per hundred of the elastomer and 20 to 40 parts per hundred of the thermoplastic, and wherein the elastomer utilized in the insulation layer consists of a member selected from the group consisting of natural rubber, polychloroprene, polyisoprene, styrene-butadiene rubber, ethylene propylene diene monomer rubber, polyurethane, and ethylene-acrylic elastomers.

3. The belt of claim 1 wherein the elastomer of the elastomeric/thermoplastic material consists of a member selected from the group consisting natural rubber, polychloroprene, polyisoprene, styrene-butadiene rubbers, polybutadiene, ethylene propylene diene monomer rubber, hydrogenated acrylonitrile-butadiene copolymers, polyurethane, and ethylene-acrylic elastomers.

4. The belt of claim 1 wherein the thermoplastic of the elastomeric/thermoplastic material is selected from the group consisting of polyolefin thermoplastic resins, polyamide thermoplastic resins, and vinyl resins.

5. The belt of claim 1, the belt having a single drive surface and a non-drive surface, the drive surface having a fabric layer bonded to the outer surface thereof, wherein the elastomeric/thermoplastic material impregnates the fabric layer, wherein the tension layer defines the non-drive surface of the belt, and wherein the fabric layer does not cover the non-drive surface of the belt.

6. The belt of claim 1, the load carrying section comprising reinforcing cords embedded in a material, the embedding material being the elastomeric/thermoplastic material.

7. The belt of claim 1 wherein the thermoplastic is a polyolefin.

8. The belt of claim 1 wherein the thermoplastic is a polyamide.

9. The belt of claim 8 wherein the polyamide is selected from the group consisting of nylon 6, nylon 66, nylon 46, nylon 11, nylon 12, nylon 610, nylon 612, nylon 6/66 copolymer, nylon 6/66/610 copolymer, nylon MXD6, nylon 6T, nylon 6/6T, nylon 66/PP copolymer, and nylon 66/PPS.

10. The belt of claim 1 wherein the thermoplastic material utilized in the insulation section is a vinyl resin selected from the group consisting of vinyl acetate, polyvinylalcohol, vinyl alcohol/ethylene copolymer, polyvinylidene chloride, polyvinyl chloride, vinyl chloride/vinylidene chloride copolymer, and vinylidene chloride/methylacrylate copolymer.

11. The belt of claim 1 wherein the thermoplastic material utilized in the insulation section is vinyl acetate.

12. The belt of claim 1 wherein the thermoplastic material utilized in the insulation section is polyvinylalcohol.

13. The belt of claim 1 wherein the thermoplastic material utilized in the insulation section is vinyl alcohol/ethylene copolymer.

14. The belt of claim 1 wherein the elastomer utilized in the insulation section is styrene-butadiene rubber.

15. The belt of claim 1 wherein the thermoplastic material utilized in the insulation section is polyvinylidene chloride.

16. The belt of claim 1 wherein the fabric layer is comprised of nylon or polyester.

17. The belt of claim 16 wherein the fabric layer is comprised of a non-woven fabric.

18. A power transmission belt having a compression section, a tension section, an insulation layer, a drive surface, and a load carrying section disposed between the compression section and the tension section, wherein the compression section is disposed between load carrying section and the insulation layer, wherein the drive surface has a fabric layer which is adhered to the outer surface thereof, wherein the load carrying section includes load carrying filaments or cords which are embedded in an elastomeric/thermoplastic material, wherein the drive surface includes multiple longitudinal V-grooves, and wherein the insulation layer is comprised of the elastomeric/thermoplastic material, the elastomeric/thermoplastic material comprising 50 to 90 parts per hundred of an elastomer and 10 to 50 parts per hundred thermoplastic wherein the thermoplastic is a vinyl resin, and wherein the elastomer consists of a member selected from the group consisting of natural rubber, polychloroprene, polyisoprene, styrene-butadiene rubber, ethylene propylene diene monomer rubber, polyurethane, and ethylene-acrylic elastomers, the tension section comprising a member selected from the group consisting of natural rubber, polychloroprene, acrylonitrile-butadiene copolymer, polyisoprene, zinc salts of unsaturated carboxylic acid ester grafted hydrogenated nitrile butadiene elastomers, styrene-butadiene rubber, polybutadiene rubber, ethylene propylene diene monomer rubber, hydrogenated acrylonitrile-butadiene copolymer, polyurethane, and ethylene-acrylic elastomers, and the compression section comprising a member selected from the group consisting of natural rubber, polychloroprene, acrylonitrile-butadiene copolymer, polyisoprene, zinc salts of unsaturated carboxylic acid ester grafted hydrogenated nitrite butadiene elastomers, styrene-butadiene rubber, polybutadiene rubber, ethylene propylene diene monomer rubber, hydrogenated acrylonitrile-butadiene copolymer, polyurethane, and ethylene-acrylic elastomers.

19. The belt of claim 18 wherein the elastomeric/thermoplastic material comprises 60 to 80 parts per hundred elastomer and 20 to 40 parts per hundred thermoplastic.

20. The belt of claim 18, the belt having a single drive surface and a non-drive surface, the drive surface having the fabric layer bonded to the outer surface thereof, wherein the elastomeric/thermoplastic material impregnates the fabric layer, wherein the tension layer defines the non-drive surface of the belt, and wherein the fabric layer does not cover the non-drive surface of the belt.

\* \* \* \* \*